United States Patent [19]

Kasama

[11] 4,284,473
[45] Aug. 18, 1981

[54] SUBMERGED ULTRASONIC VIEWER FOR A NUCLEAR REACTOR

[75] Inventor: Kiyoshi Kasama, Yokohama, Japan

[73] Assignee: Tokyo Shibaura Denki Kabushiki Kaisha, Kawasaki, Japan

[21] Appl. No.: 24,329

[22] Filed: Mar. 27, 1979

[30] Foreign Application Priority Data

Mar. 27, 1978 [JP] Japan ................... 53-35186

[51] Int. Cl.³ ........................................... G21C 17/00
[52] U.S. Cl. .................................... 176/19 R; 367/99
[58] Field of Search ................ 176/19 R; 367/151, 99

[56] References Cited

U.S. PATENT DOCUMENTS

| 3,502,811 | 3/1970 | Schroeder et al. | 367/151 |
| 3,599,747 | 8/1971 | Hansen et al. | 367/151 |
| 3,604,529 | 9/1971 | Fothergill | 367/151 |
| 4,008,455 | 2/1977 | Pedersen | 176/19 R |
| 4,169,758 | 10/1979 | Blackstone et al. | 176/19 R |

FOREIGN PATENT DOCUMENTS

| 2423782 | 11/1975 | Fed. Rep. of Germany | 176/19 R |
| 2846490 | 5/1979 | Fed. Rep. of Germany | 176/19 R |
| 51-14597 | 2/1976 | Japan | 176/19 R |
| 1461944 | 1/1977 | United Kingdom | 176/19 R |

Primary Examiner—S. A. Cangialosi
Attorney, Agent, or Firm—Oblon, Fisher, Spivak, McClelland & Maier

[57] ABSTRACT

A submerged ultrasonic viewer for use in a liquid metal cooled fast reactor vessel to detect floated reactor core components. The viewer, which includes an ultrasonic transducer, a transducer scanning drive mechanism and a related electrical control circuit, an image display circuit, and a reflecting surface, i.e. a handling head of a core element or a reflecting plate, is improved to enhance image accuracy by providing the reflecting surface with at least one continuously curved surface having a convex or a concave contour, or plural continuously curved surfaces with concave and convex contours.

4 Claims, 9 Drawing Figures

SUBMERGED ULTRASONIC VIEWER FOR A NUCLEAR REACTOR

BACKGROUND OF THE INVENTION

Field of the Invention

This invention relates to liquid metal cooled nuclear reactors, and more particularly to improved viewers using ultrasonic signals, which are submerged in the liquid metal, for detecting in a liquid metal cooled nuclear reactors the presence of a floating core component.

Background of the Invention

In one construction of a liquid metal cooled nuclear reactor, the reactor core, heat exchangers and coolant circulating pumps are submerged in a pool of liquid metal coolant. In operation of this nuclear reactor it is necessary to be able to locate and identify components submerged in the pool, and to do so before moving rotating shields in the roof of the pool in order to ensure that all the normally suspended absorber rods have been inserted in the core.

Television cameras are unsuitable for use in the opaque liquid metal to locate and identify components submerged therein. Therefore ultrasonic signals in the mega hertz frequency range have been used to produce a television-like visual display.

However, in the past difficulty has been experienced in the transmission of ultrasonic signals from a submerged transducer because the transducer must be protected from the high temperature environment of the reactor coolant and because core components do not always float up perpendicularly.

As diagrammatically shown in FIG. 1, a prior art submerged viewer utilizing ultrasonic signals is seen to consist of a transducer 10 which functions both as a transmitter and as a receiver. The transducer 10 is driven by a driving mechanism 11 installed in the center of a rotating shield 12. The submerged prior art viewer further includes a dip stick 13 by which the transducer 10 is suspended from the rotating shield 12. Transducer 10 can descend lower than a lower part 14 of upper core structure 15. Core components 16 which consist of core fuel assemblies, blanket fuel assemblies, removable shielding assemblies and the like are located under the upper core structure 15. The gap between the lower part 14 of the upper core structure 15 and the core components 16 is small, for example, about 50 mm.

Normally, none of the core components 16 float upwardly, but one of the core components 16 can be slightly floated upwardly by the pressure of liquid metal and the like. In order to prevent any floating core components from colliding with the lower part 14 of the upper core structure 15, the submerged viewer detects the floating core components. Namely, the ultrasonic signals which are transmitted from the transmitter of transducer 10 are reflected by the handling head 17 of the floating core components and the reflected ultrasonic signals from the handling head 17 are scanned by the receiver of transducer 10. Accordingly, when the viewer detects a floating core component, the action of the upper core structures 15, for example, control rod driving mechanism, are stopped to prevent the floating core components from colliding with the upper core structures 15.

Furthermore, as diagramatically shown FIG. 2, another prior art submerged viewer utilizing ultrasonic signals is seen to include a transducer 10 set aside from the center of rotating shield 12, and reflector plates 18 in the reactor vessel. The ultrasonic signals which are transmitted from the transmitter of transducer 10 are reflected by the reflecting plates 18 and the reflected ultrasonic signals from the reflector plates 18 are scanned by the receiver of the transducer 10.

Theoretically, prior art viewers submerged in liquid metal can detect floating core components effectively. However actually reflected ultrasonic sounds from the handling head 17 of the floating core components (in FIG. 1) or from the reflecting plates 18 (in FIG. 2) are not always received by the receiver of the transducer 10, for reasons hereinafter described. This is true because the handling head 17 of the core component 16 has, as shown in FIG. 3, a hexagonal cross-section. Therefore, the ultrasonic signals which are transmitted from the transmitter of the transducer 10 are not reflected to the receiver of the transducer 10 because of torsion or inclination of the handling head 17 owing to any thermal stress in the handling head 17 or to the pressure of liquid metal. Also, in the prior art embodiment of FIG. 2, the reflecting plates 18 are installed in the hot liquid metal and are so distorted or inclined owing to thermal stress therein so that the reflected ultrasonic signals from the reflecting plates 18 may not be scanned by the receiver of the transducer 10.

SUMMARY OF THE INVENTION

Accordingly, it is the object of this invention to provide an improved submerged viewer for detecting floating core components in a liquid metal coolant pool within a liquid metal cooled nuclear reactor, of the type in which transducer means transmits and receives ultrasonic signals, driving means is coupled to the transducer means for scanning the reactor with transmitted ultrasonic signals, and display means is provided for depicting an image of received ultrasonic signals reflected off the floating core components, wherein each core component is provided with at least one continuously curved surface for reflecting ultrasonic signals to the transducer means. The reflecting surface can be either concave or convex, or the core component can be provided with plural reflecting surfaces, at least one of which is concave and at least one of which is convex.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figures 4, 5:
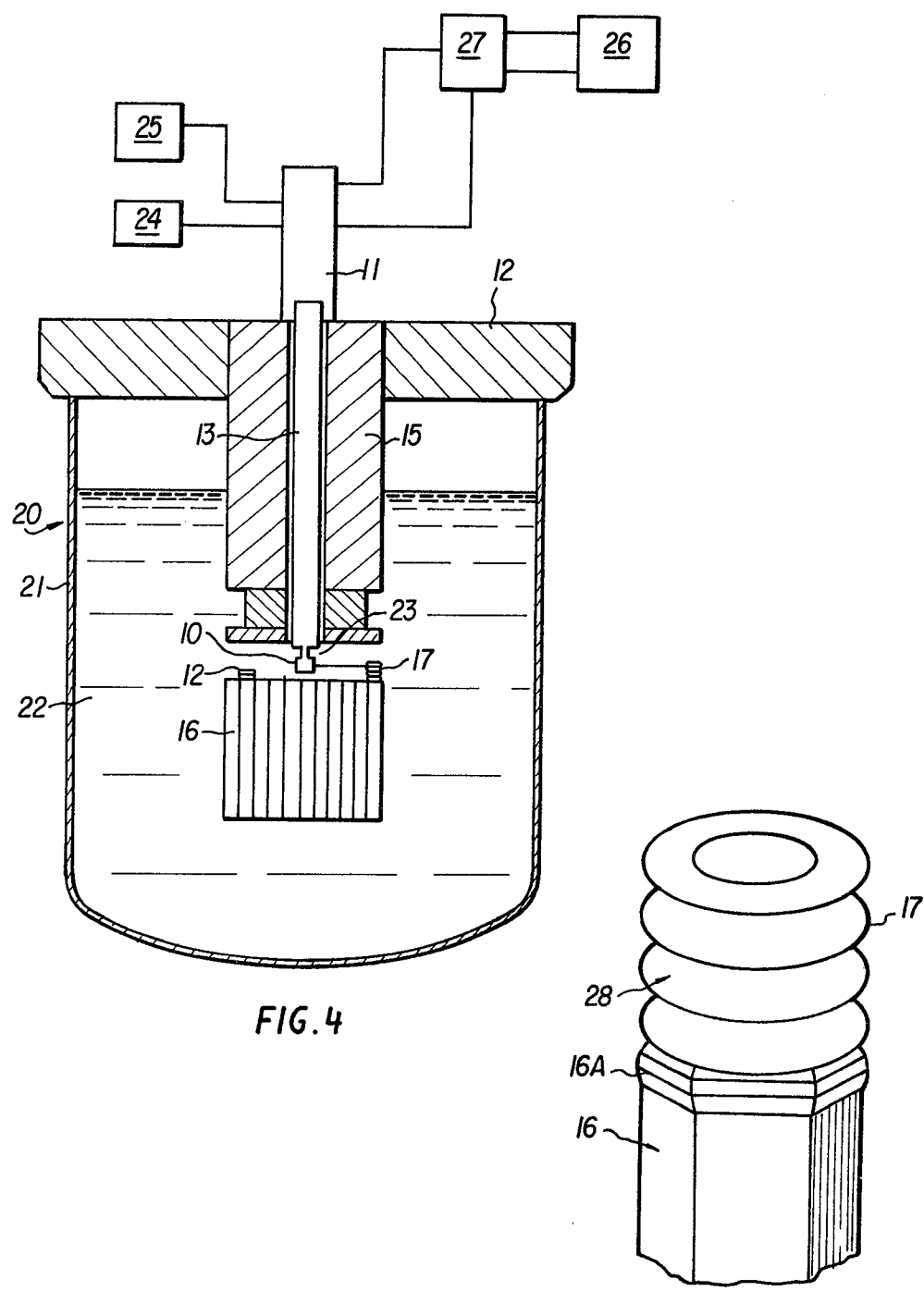
FIG. 4 is a view similar to that of FIG. 1 illustrating one embodiment of this invention.
FIG. 5 is a view similar to that of FIG. 3 illustrating the improved core component reflecting surfaces according to this invention.

Referring now to the drawings, wherein like reference numerals designate identical or corresponding parts throughout the several views, and more paticularly to FIG. 4 thereof, there is shown a reactor 20 which includes a reactor vessel 21 in which liquid metal coolant 22, for example liquid sodium, is contained to exchange heat energy between the hot liquid metal and some cooler region not shown). The construction has core components 16 which consists of core fuel assemblies, removable shielding assemblies and the like, and upper core structure 15 which consists of a control rod driving mechanism, failed fuel detection system, temperature detector, flow meter, acoustic detector and the like in the reactor vessel 21. There is provided a rotating shield 12 from which upper core structure 15 is suspended over the reactor vessel 21.

There is provided a driving mechanism 11 in the center of the rotating shield 12. The ultrasonic signals transmitting and receiving means 23 for scanning the floated handling head 17 of the core components 16 are connected to the driving mechanism 11. The emitting and receiving means 23 comprises a dip tube 13 housing an ultrasonic transducer unit 10 which is rotable about the longitudinal axis of the dip tube 13 and slidably guided along the dip tube 13. Thus the transducer unit 10 is submerged in liquid metal which is at a tolerable temperature. The driving mechanism 11 which controls the transducer unit 10 is controlled by a control device 24. An oscillator 25 generates the ultrasonic signals and transmits them to transducer unit 10. An image display circuit 26, for example a CRT display, is connected with the transducer unit 10 through an electrical control circuit 27.

Referring now to FIG. 5, there is shown in greater detail the handling head 17 of core component 16 which reflects the transmitted ultrasonic signals from the transmitter of the transducer unit 10 to the receiver of the transducer unit 10. The handling head 17 of each core component 16 is installed on the respective core components 16 via a spacer pad 16A.

In operation, ultrasonic signals are generated by the oscillator 25 and transmitted to the lower end of the dip tube 13 and to the transducer 10 which is connected to the lower end of the dip tube 13. The control device 24 controls the action of the dip tube 13 and the transducer unit 10. Consequently, by the control of the control device 24, the transducer unit 10 is submerged in liquid metal and the dip tube 13 is rotable about the longitudinal axis and slidably guided along the dip tube 13 so that all regions of the reactor vessel 21 can be scanned.

The ultrasonic signals which are emitted from the transducer unit 10 are reflected against the handling head 17, when one of the core components 16 floats upwardly. Then the reflected signals are received by the transducer unit 10 and transmitted to the image display circuit 26, disposed outside the reactor vessel 21, through the electrical control circuit 27. Thus the image display circuit 26 provides an indication of the floated core component on its display unit. Then the operator can stop conducting the fuel exchanges when he sees the floated core component on the display unit of the image display 26.

The reflecting surface 28 mounted upon the core components 16 via the spacer pad 16A consists of 4 continuous convex curved surfaces, as shown in FIG. 5. Thus, the reflecting surface 28 has such a construction that ultrasonic signals emitted from the transducer unit 10 are returned to the transducer unit 10, even if the handling head 17 is distorted or inclined owing to thermal stress or to the pressure of the liquid metal.

Figure 6:
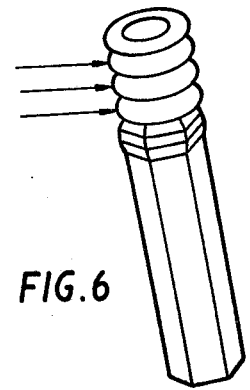
FIG. 6 is a view similar to that of FIG. 3 showing an inclined core component according to this invention.

FIG. 6 shows the inclined core component.

Figure 7:
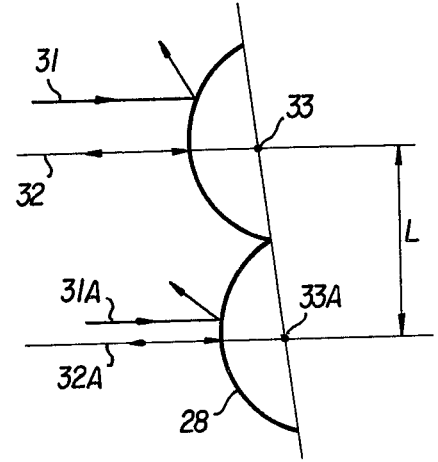
FIG. 7 is a fragmentary sectional view of the core component handling head shown in FIG. 5.

FIG. 7 shows a cross-sectional view of a handling head 17 of core component 16. The transducer unit 10 (not shown in FIG. 7) emits ultrasonic signals 31 and 32 to the handling head 17 of the core component. The ultrasonic signal 31 is reflected in a different direction than that of the transducer unit 10, but the ultrasonic signal 32 is reflected in the direction of the transducer unit 10, because the signal 32 is emitted to the center 33 of the convex surface 28.

The ultrasonic signals 31A and 32A are reflected in the same direction as the ultrasonic signals 31 and 32. Accordingly, when the transducer unit 10 is lowered below the upper part of the handling head 28 or the handling head 28 floats up too highly, the transducer unit 10 can receive the reflected signals.

Distance L between the centers 33 and 33A of the handling head 28 is preferably smaller than the range with which the ultrasonic signals are emitted from the transducer unit 10, because at least a beam of the ultrasonic signals is transmitted to the center of the handling head.

Figure 8:
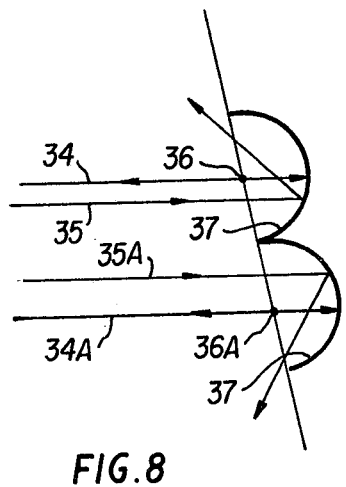
FIG. 8 is a view similar to that of FIG. 7 showing another embodiment of this invention; and, FIG. 9 is a view similar to that of FIG. 7 showing one more embodiment of this invention.

In FIG. 8 the reflecting surface 37 consists of continuous concave surfaces. The transducer unit 10 emits the ultrasonic signals 34 and 35 to the handling head 17 of the core component 16. The ultrasonic signals 35 is reflected in a different direction from that of the transducer unit 10, but the ultrasonic signal 34 is reflected to the transducer unit 10, because the signal 34 is emitted to the center 36 of the concave surface 37.

Figure 9:
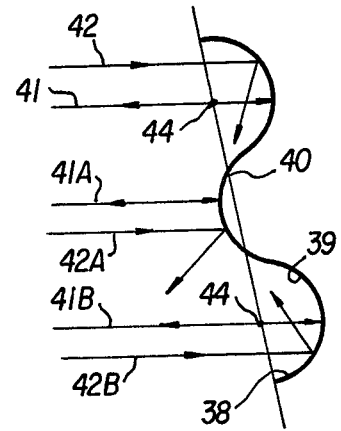

FIG. 9 shows another embodiment of this invention. In FIG. 9 the reflecting surface 38 consists of concave surface 39 and convex surface 40. The transducer unit 10 emits the ultrasonic signals 41 and 42 to the reflecting surface 38 of the handling head 17. The ultrasonic signal 42 is reflected in the different direction than that of the transducer unit 10, but the ultrasonic signal 41 is reflected to the transducer unit 10, because the signal 41 is emitted to the center 44 of the curved surface 38.

Figure 1:
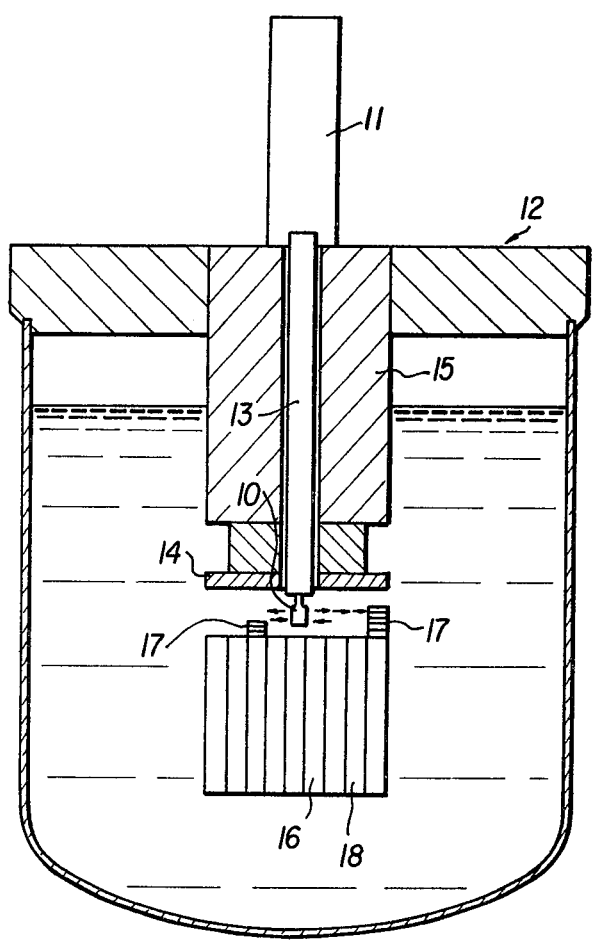
FIG. 1 is a diagrammatic longitudinal cross-sectional view illustrating the construction of a reactor vessel using a prior art submerged viewer for detecting floating core components.
Figure 2:
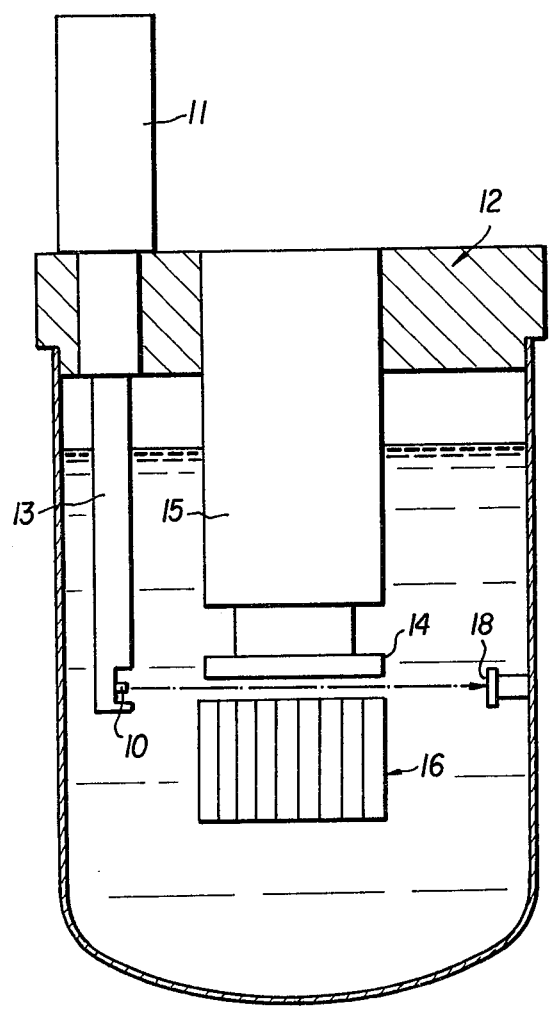
FIG. 2 is a view similar to that of FIG. 1 showing a reactor vessel using another prior art submerged viewer.
Figure 3:
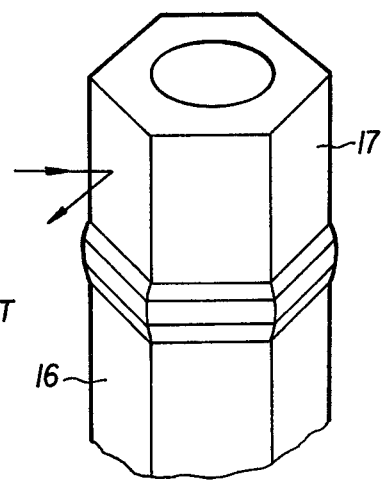
FIG. 3 is a prespective view of a handling head of a reactor core component.

The above teachings disclosed in conjunction with FIGS. 4-9 also apply to an embodiment using reflector plates 18 shown in FIG. 2. Thus if reflector plates are used in combinations with a core component of the type shown in FIG. 3, the reflector plates 18 can be provided with at least one continuously curved reflecting surface, or more than one reflecting surface (convex and/or concave) in order to improve reflection of ultrasonic signals to the transducer 10.

Obviously, numerous modifications and variations of the present invention are possible in light of the above teachings. For example, while it is presently envisioned that the handling heads 17 of the core components 16 have a circular cross-section in a plane perpendicular to the longitudinal axis of the component 16, other cross-sectional shapes may be possible so long as the continuously curved reflecting surfaces are provided. It is therefore to be understood that within the scope of the appended claims, the invention may be practiced otherwise than as specifically described herein.

I claim:

1. In a viewer for detecting floating core components in a liquid metal coolant of a liquid metal cooled nuclear reactor, said viewer submerged in said coolant and including transducer means for transmitting ultrasonic signals and for receiving reflected ultrasonic signals, driver means coupled to said transducer means for scanning said reactor with said ultrasonic signals, and display means for displaying images corresponding to reflected signals received by said transducer means, the improvement comprising:

said core components each having a rod-like shape defining a longitudinal axis and characterized by polygonal cross-sections in planes perpendicular to said longitudinal axis; and said rod-like core components provided with a reflecting handling head at one end thereof wherein said reflecting handling head is constructed of varying thickness to define at least one continuously curved reflecting surface around the circumference of said handling head for reflecting ultrasonic signals to said transducer means.

2. The ultrasonic viewer defined in claim 1 wherein the at least one reflecting surface of said handling head comprises:

a concave surface.

3. The ultrasonic viewer defined in claim 1 wherein the at least one reflecting surface of said handling head comprises:

a convex surface.

4. The under liquid metal ultrasonic viewer defined in claim 1 wherein said handling head comprises plural continuously curved reflecting surfaces including at least one convex surface and at least one concave surface.

* * * * *